(12) United States Patent
Nishii

(10) Patent No.: US 6,437,883 B1
(45) Date of Patent: Aug. 20, 2002

(54) FACSIMILE APPARATUS AND PRINT CONTROL METHOD

(75) Inventor: Teruyuki Nishii, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/338,519

(22) Filed: Jun. 23, 1999

(30) Foreign Application Priority Data

Jun. 26, 1998 (JP) ............................................ 10-181100

(51) Int. Cl.⁷ ................................................. H04N 1/32
(52) U.S. Cl. .................... 358/468; 358/1.8; 358/1.9; 347/37; 347/20
(58) Field of Search ......................... 358/468, 1.9, 1.8, 358/1.2, 1.12, 1.1; 347/3, 16, 20, 65, 114, 17, 37, 5, 14

(56) References Cited

U.S. PATENT DOCUMENTS

| | | | | |
|---|---|---|---|---|
| 4,313,124 A | * | 1/1982 | Hara ............................ 346/140 |
| 4,345,262 A | * | 8/1982 | Shirato et al. ............... 346/140 |
| 4,459,600 A | * | 7/1984 | Sato et al. ................... 346/140 |
| 4,463,359 A | * | 7/1984 | Ayata et al. .................. 346/140 |
| 4,558,333 A | * | 12/1985 | Sugitani et al. .............. 346/140 |
| 4,723,129 A | * | 2/1988 | Endo et al. ................... 346/1.1 |
| 4,740,796 A | * | 4/1988 | Endo et al. ................... 346/1.1 |
| 5,097,343 A | * | 3/1992 | Chiba et al. |
| 5,367,325 A | * | 11/1994 | Yano et al. |
| 5,617,122 A | * | 4/1997 | Numata et al. |
| 5,943,068 A | * | 8/1999 | Ono et al. |
| 6,076,916 A | * | 6/2000 | Kaneka |
| 6,144,460 A | * | 11/2000 | Omo et al. |
| 6,145,950 A | * | 11/2000 | Ohtsuka et al. |
| 6,175,424 B1 | * | 1/2001 | Lino et al. |
| 6,226,100 B1 | * | 5/2001 | Murata et al. |
| 6,331,898 B1 | * | 12/2001 | Yokoi et al. |
| 6,334,665 B1 | * | 1/2002 | Yoshida |

FOREIGN PATENT DOCUMENTS

| | | | | |
|---|---|---|---|---|
| EP | 0794060 A2 | * | 3/1997 | |
| EP | 0929032 A2 | * | 7/1999 | ............ B41N/5/26 |
| JP | 54-56847 | * | 5/1979 | ............. B41J/3/04 |
| JP | 59-123670 | * | 7/1984 | ............. B41J/3/04 |
| JP | 59-138461 | * | 8/1984 | ............. B41J/3/04 |
| JP | 60-71260 | * | 4/1985 | ............. B41J/3/04 |

\* cited by examiner

*Primary Examiner*—Edward Coles
*Assistant Examiner*—Tia A Carter
(74) *Attorney, Agent, or Firm*—Fitzpatrick, Cella, Harper & Scinto

(57) ABSTRACT

A facsimile apparatus and a print control method for performing optimum printing corresponding to electric consumption of a print operation mode by dynamically changing the number of scannings in multipath printing in accordance with the print operation mode. The facsimile apparatus has a printing unit capable of multipath print control using a printhead, a reading unit for reading an original image, a communication controller for transmitting/receiving facsimile image data and a display unit for displaying transmission/reception status of the data and a message. In the facsimile apparatus, printing duty of printing by the printhead is calculated based on print data, and electric power which can be supplied for printing by the printhead is calculated, based on the operation statuses of the reading unit, the communication controller and the display unit. Then a number of scannings in the multipath print control is calculated based on the calculation results, and printing is performed by scanning the printhead based on the number of scannings.

21 Claims, 8 Drawing Sheets

FACSIMILE APPARATUS AND PRINT CONTROL METHOD

BACKGROUND OF THE INVENTION

This invention relates to a facsimile apparatus and a print control method, and more particularly, to a facsimile apparatus having a printhead according to an ink-jet printing method in its printing unit and a print control method for the apparatus.

Conventionally, in a facsimile apparatus which performs printing using a printhead according to the ink-jet printing method, the number of dots printed in one scanning by the printhead is determined by the number of ink discharge nozzles arrayed in a direction vertical to a main scanning direction of the printhead.

Further, the power source capacity of the apparatus is highly dependent on the amount of electric power necessary for discharging ink droplets from the printhead.

To reduce the power source capacity in correspondence with cost down and downsizing of the apparatus, a print control (multipath printing) is made to complete a print image by performing plural times of print scanning with respect to the same area by the printhead if the printing by the printhead excesses a predetermined amount.

However, in the above conventional art, as the number of scannings with respect to the same area in multipath printing is calculated from the amount of maximum electric consumption of the apparatus, even if the power supply is sufficient and image printing can be completed only by one print scanning, print scanning may be made plural times. In this case, printing time is unnecessarily long.

SUMMARY OF THE INVENTION

Accordingly, it is an object of the present invention to provide a facsimile apparatus which performs optimum printing corresponding to electric consumption by dynamically changing the number of scannings in multipath printing in accordance with a printing operation mode.

According to one aspect of the present invention, the foregoing object is attained by providing a facsimile apparatus having a printing unit capable of multipath print control using a printhead and a plurality of means for facsimile communication, requiring electric consumption, comprising: first calculation means for calculating printing duty of printing by the printhead, based on print data; second calculation means for calculating electric power which can be supplied for the printing by the printhead, based on operation statuses of the plurality of means; third calculation means for calculating a number of scannings in the multipath print control, based on the results of calculations by the first and second calculation means; and control means for controlling the printing by scanning the printhead based on the number of scannings calculated by the third calculation means.

Further, the plurality of means include: reading means for reading an original image; communication control means for transmitting/receiving facsimile image data via a communication line; and display means for displaying transmission/reception status of facsimile image data or a message.

The second calculation means calculates the electric power which can be supplied for the printing by the printhead, based on respective operation statuses of the reading means, the communication control means and the display means. Accordingly, if the communication control means and the reading means do not operate, the amount of the electric power which can be supplied to the printhead is large, while if the communication control means and the reading means operate, the amount of the electric power which can be supplied to the printhead is small.

Preferably, the printhead is an ink-jet printhead which performs printing by discharging ink. In this case, it is preferable that the ink-jet printhead includes electrothermal transducers for generating thermal energy to be applied to the ink, for discharging ink by utilizing the thermal energy.

Preferably, the apparatus further comprises a plurality of mask patterns for the multipath print control. In this case, it is preferable that the control means generates a new mask pattern by combining the plurality of mask patterns, for performing printing based on the number of scannings calculated by the third calculation means.

Further, it is preferable that the apparatus further comprises scanning means for scanning the printhead, and that calculation by the first calculation means is performed based on print data used for printing with respect to an area scanned by one scanning of the printhead by the scanning means, and calculations by the second and third calculation means are performed upon each printing on the area.

According to another aspect of the present invention, the foregoing object is attained by providing a print control method used in a facsimile apparatus having a printing unit capable of multipath print control using a printhead, a reading unit for reading an original image, a communication controller for transmitting/receiving facsimile image data via a communication line and a display unit for displaying transmission/reception status of the facsimile image data and a message, comprising: a first calculation step of calculating printing duty of printing by the printhead, based on print data; a second calculation step of calculating electric power which can be supplied for the printing by the printhead, based on operation statuses of at least the reading unit, the communication controller and the display unit; a third calculation step of calculating a number of scannings in the multipath print control, based on the results of calculations at the first and second calculation steps; and a control step of controlling the printing by scanning the printhead based on the number of scannings calculated at the third calculation step.

According to still another aspect of the present invention, the foregoing object is attained by providing a computer program product, stored in a computer readable medium, which performs a print control in a computer of a facsimile apparatus including a printing unit capable of multipath print control using a printhead, a reading unit for reading an original image, a communication controller for transmitting/receiving facsimile image data via a communication line and a display unit for displaying transmission/reception status of the facsimile image data and a message, comprising: first calculation process procedure code for calculating printing duty of printing by the printhead, based on print data; second calculation process procedure code for calculating electric power which can be supplied for the printing by the printhead, based on operation statuses of at least the reading unit, the communication controller and the display unit; third calculation process procedure code for calculating a number of scannings in the multipath print control, based on the results of calculations at the first and second calculation processes; and control process procedure code for controlling the printing by scanning the printhead based on the number of scannings calculated at the third calculation process.

In accordance with the present invention as described above, upon printing by a facsimile apparatus comprising a printing unit capable of multipath print control using a printhead, a reading unit which reads an original image, a communication controller which transmits/receives facsimile image data via a communication line and a display unit which displays facsimile image data transmission/ reception status or a message, printing duty of printing by the printhead is calculated based on print data, then electric power which can be supplied for printing by the printhead is calculated based on the operation statuses of the reading unit, the communication controller and display unit, then a number of scannings in the multipath print control is calculated based on the results of calculation, and printing is performed by scanning the printhead based on the calculated number of scannings.

The invention is particularly advantageous since the facsimile apparatus can perform optimum printing using electric power which can be supplied for printing by the printhead as much as possible, in consideration of operation statuses of the plurality of means, respectively consuming electric power, used for facsimile communication.

In this arrangement, in consideration of the electric consumption which changes in accordance with the operations of the plurality of means, if a large amount of electric power can be supplied to the printhead, for example, the number of scanning times in multipath print control is reduced, and printing can be performed at a high speed. In this manner, optimum printing can be performed without degrading the printing performance.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
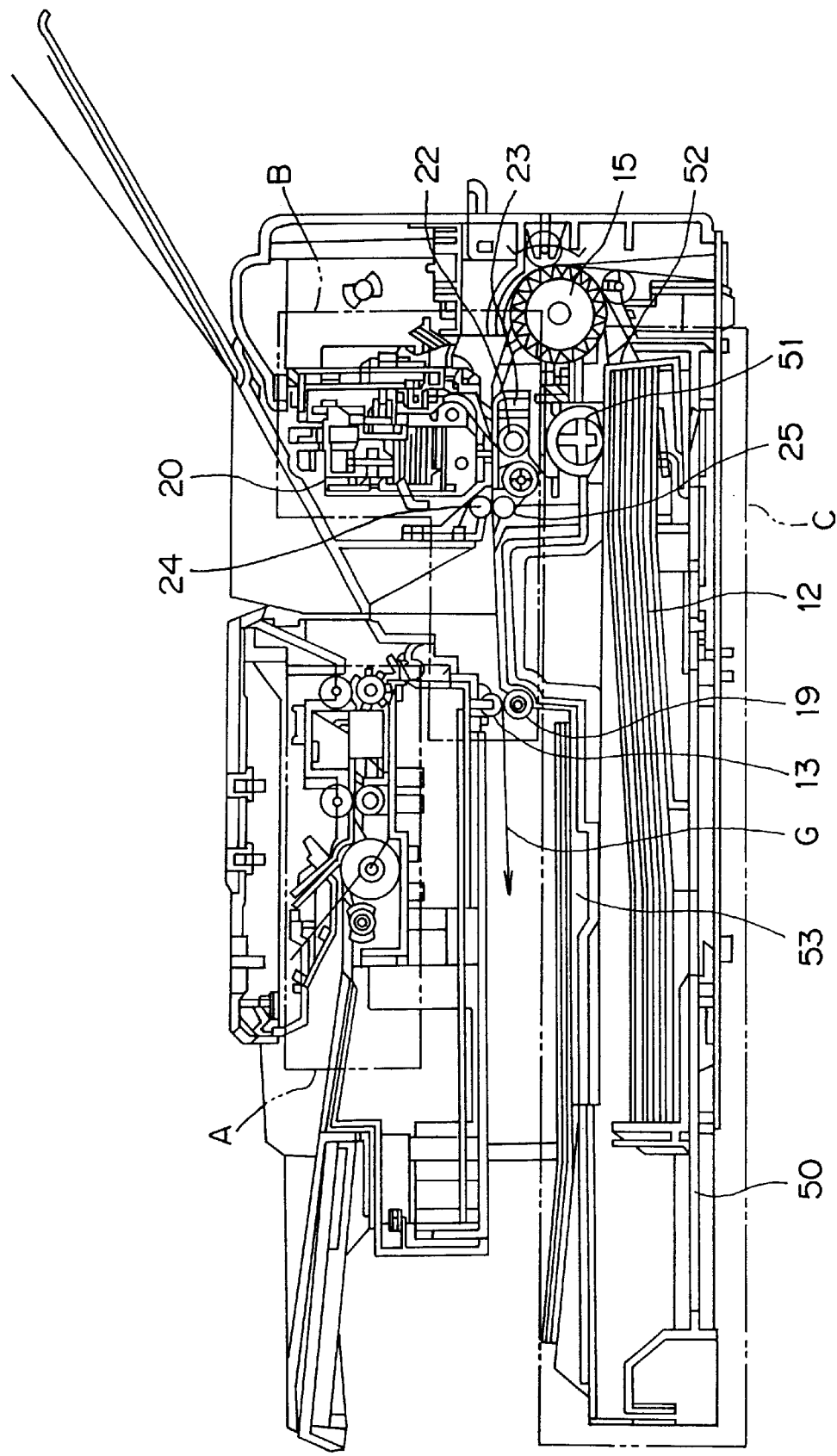
FIG. 1 is a cross sectional side view showing the structure of a facsimile apparatus as a representative embodiment of the present invention.

FIG. 1 is a cross sectional side view showing the structure of a facsimile apparatus as a representative embodiment of the present invention. In FIG. 1, a letter A denotes a reading unit which optically reads an original image; B, a printing unit having a printhead which performs printing in accordance with the ink-jet method and an ink tank which supplies ink to the printhead; and C, a paper feeder which supplies cut-sheet type print sheets held in a cassette, one by one, to the printing unit B. Further, the printhead and the ink tank are integrated into an exchangeable ink cartridge.

The apparatus having the structure as shown in FIG. 1 performs a printing operation with respect to the print sheet as follows. First, a print sheet 12 set in a cassette 50 is picked up by a paper feed roller 51 and a separation claw 52, and fed by a conveyance roller 15 to the printing unit B. Next, in the printing unit B, a printhead 20 performs printing by discharging ink onto the print sheet 12 while scanning in a vertical direction of this paper surface. The direction of the movement of the printhead 20 is called a main scanning direction. Each time printing by one scanning has been completed, the print sheet 12 is shifted by a printing width of one scanning of the printhead 20 in a direction represented by an arrow G in FIG. 1. In this manner, the printing is proceeded, and when the printing with respect to the print sheet 12 has been completed, the print sheet 12 is discharged by conveyance rollers 13 and 19 made of rubber or the like to a stacker 53 and stacked there.

Figure 2:
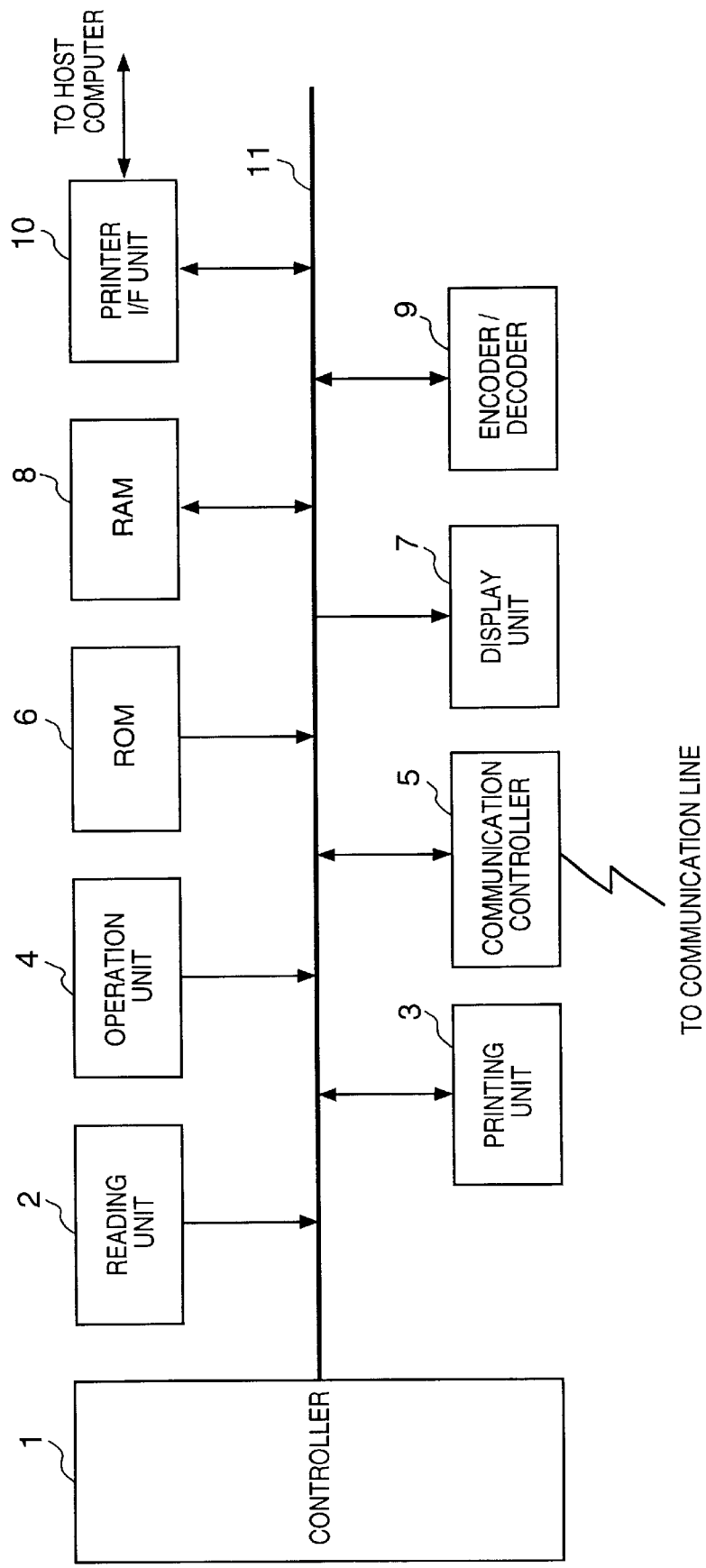
FIG. 2 is a block diagram showing the functional construction of the facsimile apparatus in FIG. 1.

FIG. 2 is a block diagram showing the functional construction of the facsimile apparatus used in the present embodiment. The facsimile apparatus uses a printing unit which performs printing by using a printhead according to the ink-jet method.

In FIG. 2, reference numeral 1 denotes a controller, comprising a microprocessor (MPU) or the like, which controls the overall apparatus; 2, a reading unit comprising a scanner which reads an original image; 3, a printing unit according to the ink-jet method which performs image printing based on a received image signal or a read image signal, or outputs various reports in accordance with instructions from the controller; 4, an operation unit which enables operator's various instructions of image transmission, image copying and report output, registration of telephone number (s) of communication destination(s), message response and the like; and 5, a communication controller, comprising a modem, an NCU (Network Control Unit) and the like, which transmits/receives communication data. The printing unit 3 has the printhead and an exchangeable ink cartridge to be described later.

Further, numeral 6 denotes a ROM for storing a control program and various processing programs executed by the controller 1; 7, a display unit, comprising an LCD or the like, which displays guidance messages upon registration of telephone number, various alarming messages, time, image transmission/reception status and the like; 8, a RAM used by the controller 1 as a work area upon execution of control program and processing programs, or used for storing various constants inputted by the operator from the operation unit 4 and transmission/reception image data; 9, an encoder/ decoder which performs encoding and decoding on image data; 10, a printer I/F (interface) unit, comprising a Centronics connector, driver and the like widely used in printer devices, which controls input/output of various commands and data between a host computer (hereinafter simply referred to as "host") and the present apparatus; and 11, a common bus interconnecting the constituents.

The controller 1 performs a multipath print control to perform printing by scanning the printhead of the printing unit 3 plural times with respect to the same area on a printing medium such as a print sheet.

Figure 3:
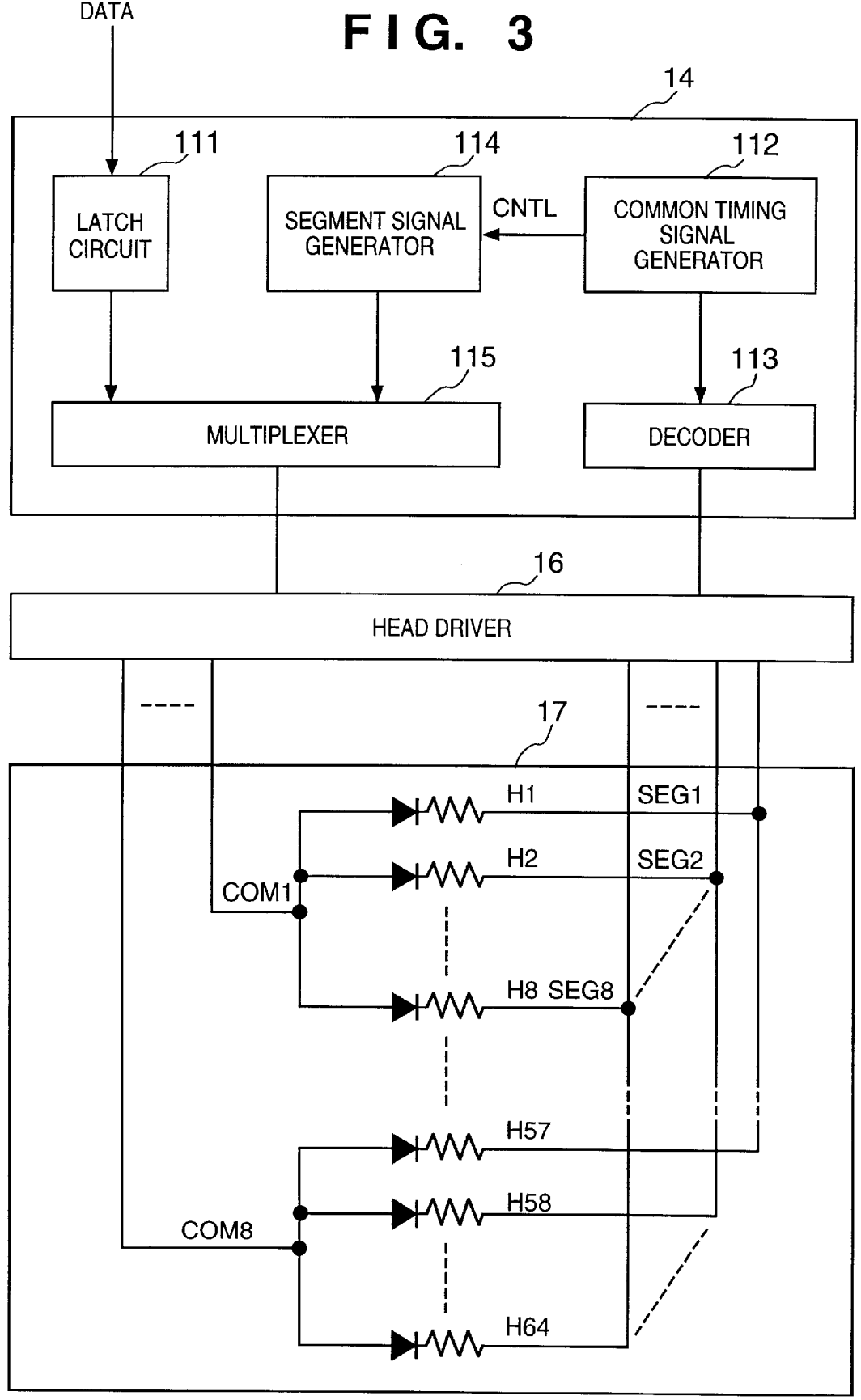
FIG. 3 is a block diagram showing the construction of principal parts of a printing unit 3 in FIG. 2.

FIG. 3 is a block diagram showing the construction of principal parts of the printing unit 3. The printing unit has a feed and transfer mechanism to feed or transfer a printing medium such as a print sheet, a carriage to scan the printhead opposing to the print sheet and a moving mechanism for the carriage, however, as these mechanisms are already known, they are omitted in FIG. 3. Further, an ink cartridge to supply ink for printing is attached to the printhead.

The ink may be supplied from the ink tank attached to the printing unit 3. Otherwise, it may be arranged such that the printhead and the ink tank are integrated into a cartridge, and when ink in the ink tank is exhausted, the cartridge is exchanged for new one.

Note that the printing unit 3 of the present embodiment is a printer for monochrome printing. The printhead has 64 nozzles to discharge ink droplets in the shifting direction of the print medium. The 64 nozzles are divided into eight 8-nozzle groups in two ways to be described later. If 1-bit image data corresponding to one nozzle has a bit value "1 (ON)", the corresponding nozzle discharges an ink droplet for printing, however, if the bit value is "0 (OFF)", the corresponding nozzle does not discharge an ink droplet.

In the following description, the direction of movement of the carriage carrying the printhead is called a main scanning direction, and a direction in which the printing medium is shifted (nozzle array direction) is called a subscanning direction.

In FIG. 3, numeral 14 denotes a print data generator which latches print data or selects a nozzle group; 16, a head driver which drives the printhead by two types of signals (segment signals SEG1 to SEG8 and common signals COM1 to COM8); 17, a logic circuit of the printhead.

The print data generator 14 comprises a latch circuit 111 which inputs and latches image data stored in the RAM 8 under the control of the controller 1 in 64 bits (8 bytes) units, a common timing signal generator 112 which generates the common signals COM1 to COM8, a decoder 113 which decodes the common signals COM1 to COM8 and outputs the decoded signals to the head driver 16, a segment signal generator 114 which generates the segment signals SEG1 to SEG8 in synchronization with generation of the common signals COM1 to COM8 in timing to be described later, and a multiplexer 115 which multiplexes the image data latched by the latch circuit 111 with any one of the segment signals SEG1 to SEG8, by 1 byte, and outputs the multiplexed signal to the head driver 16.

The common timing signal generator 112 sequentially generates the eight common signals COM1 to COM8.

The logic circuit 17 of the printhead has 64 heaters (H1 to H64) corresponding to the 64 nozzles. Each heater has a diode and a resistor to generate heat based on an applied current. The heaters H1 to H64 are divided into eight groups (H1, H9, H17 . . . , H57; H2, H10, . . . , and H58; . . . ; and H8, H16, . . . , H64), and each nozzle group is selected by the segment signals SEG1 to SEG8. Further, the heaters H1 to H64 are divided into eight groups (H1 to H8, H9 to H16, H17 to H24, H25 to H32, H33 to H40, H41 to H48, H49 to H56 and H57 to H64) different from the above eight groups, and each nozzle group is selected by the common signals COM1 to COM8.

Figure 4:
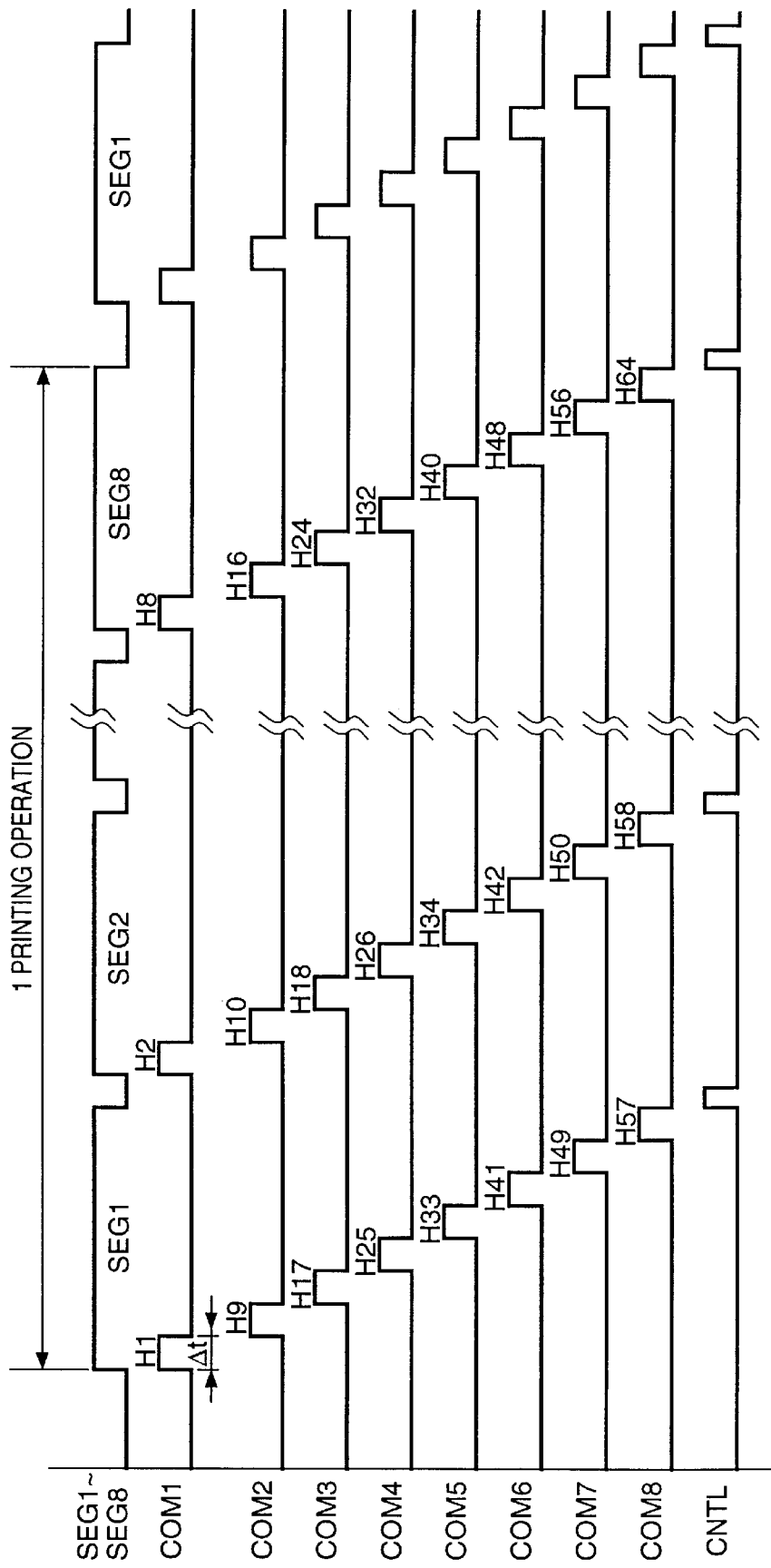
FIG. 4 is a timing chart showing the relation between common signals (COM1 to COM8) and segment signals (SEG1 to SEG8) in one printing operation.

FIG. 4 is a timing chart showing the relation between the common signals (COM1 to COM8) and the segment signals (SEG1 to SEG8) in one printing operation. In FIG. 3, numerals H1, H2, . . . , represent heaters to which a drive current is applied when corresponding common signal (COM1 to COM8) and segment signal (SEG1 to SEG8) are "ON". As shown in FIG. 4, while one of the segment signals, e.g., SEG1, is "ON", the common signals COM1, COM2, . . . , COM8 are sequentially turned "ON" for a predetermined period ($\Delta t$). Then, while another segment signal, e.g., SEG2, is "ON", the common signals COM1, COM2, . . . , COM8 are sequentially turned "ON" for the predetermined period ($\Delta t$) again. In this manner, in printing, the drive current flows through a heater (H1 to H64) in which the status of the corresponding common signal and the status of the corresponding segment signal outputted from the head driver 16 are "ON", and the heater heats ink, to discharge an ink droplet from the corresponding nozzle. Thus, all the 64 heaters are sequentially electrified and one printing operation is completed.

Further, when one cycle where the common signals COM1 to COM8 sequentially become "ON" has been completed, the common timing signal generator 112 outputs a control signal CNTL to the segment signal generator 114. Each time the segment signal generator 114 receives the control signal CNTL, it changes the segment signal, SEG1→SEG2→ . . . →SEG8, sequentially.

Note that in the timing chart of FIG. 4, it seems that the "ON" state of the segment signals (SEG1 to SEG8) is maintained while the common signals COM1 to COM8 are sequentially "ON" for the predetermined period ($\Delta t$) ($8 \times \Delta t$), however, as the segment signals (SEG1 to SEG8) are obtained by multiplexing with latched image data (e.g., logical products), if the value of image data of a pixel is "0 (OFF)", for example, the corresponding segment signal (SEG1 to SEG8) becomes "OFF" for the corresponding period. In this case, the corresponding heater is not electrified, and no ink droplet is discharged.

Further, in the present embodiment, in accordance with an operation mode to be described later, the number of nozzles which can discharge ink droplets in one scanning in a multipath print control is calculated, in consideration of electric consumption of the entire apparatus, and based on the calculated number of nozzles, the number of scannings in the multipath print control is determined.

FIGS. 5A to 5G show the principle of discharging an ink droplet from a printhead in the ink-jet printing method.

Figure 5A:
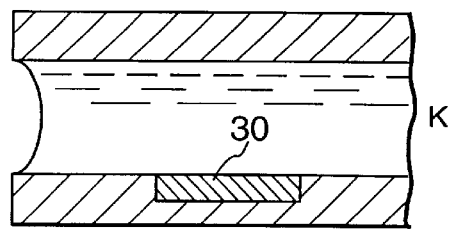
FIGS. 5A to 5G are explanatory views showing the principle of ink droplet discharge from a printhead according to the ink-jet method.
Figure 5B:
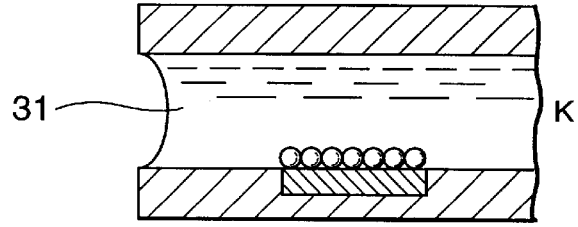
Figure 5C:
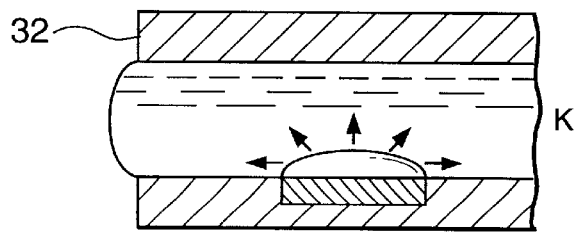

In the stationary state, as show in FIG. 5A, ink 31 filled in a nozzle 32 is in a state where the surface tension of the ink at an orifice is in equilibrium to external pressure. In order to discharge the ink under this condition, first, an electric current is supplied to an electrothermal transducer 30 so as to cause a rapid rise in temperature in the nozzle. As a result, a film boiling in the ink of the nozzle occurred. According, as shown in FIG. 5B, the ink 31 neighboring to the electrothermal transducer 30 is heated up and tiny bubbles are created, then the heated portion of the ink vaporizes, thus reaching the film in boiling state. As a result, a bubble rapidly grows as shown in FIG. 5C.

Figure 5D:
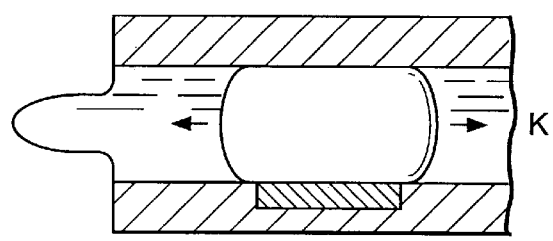
Figure 5E:
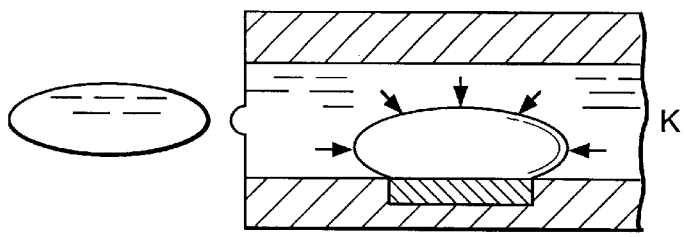

During the growth stage in which the bubble grows to the maximum as shown in FIG. 5D, ink is forced out from an orifice of the nozzle, and the ink forms an ink droplet. After this, the grown bubble cools down in the nozzle and shrinks as shown in FIG. 5E. As described above, an droplet is discharged from the orifice by growth and shrinkage of the bubble. The size of the ink droplet 33 can be controlled by electric current supply time and sequence to the electrothermal transducer 30.

Figure 5F:
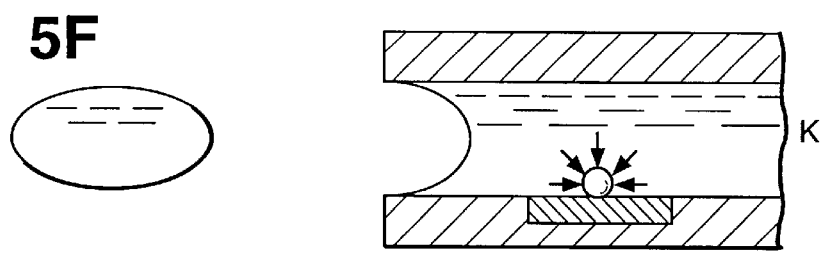
Figure 5G:
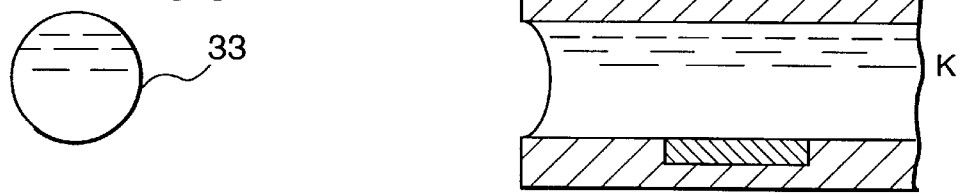

Further, as shown in FIG. 5F, the ink adjacent to/in contact with the surface of the electrothermal transducer 30 is rapidly cooled down, and the bubble disappears or shrinks to an ignorable volume. As the bubble shrinks, ink is provided from a common ink chamber side (K) to the nozzle caused by the capillary phenomenon, as shown in FIG. 5G, and ready for the next current supply.

Therefore, by reciprocating a carriage, loaded with a printhead (the moving direction of the carriage is referred as "main scanning direction", hereinafter), and discharging an ink droplet from the nozzle by supplying an electric current to an electrothermal transducer in response to an image signal in synchronization with the carriage movement, an ink image is printed on recording medium, such as printing paper.

In the principle as described above, an ink droplet is formed in accordance with an image signal, thereby an image is printed on recording medium.

FIGS. 6A to 6D are schematic diagrams showing use of functional blocks of the apparatus in respective operations. These figures show operating functional block(s) and functional block(s) on standby among the four functional blocks of the facsimile apparatus, the reading unit, the printing unit, the communication controller and the display unit, in the following four operation modes.

Figure 6A:
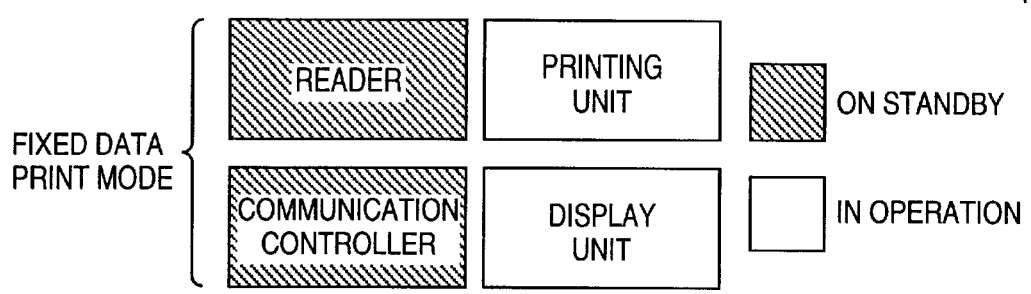
FIGS. 6A to 6D are brief schematic diagrams showing use of functional blocks of the apparatus in respective operations.

FIG. 6A shows functional blocks which operate in a mode to print various reports or an image stored in the memory (fixed data print mode). In FIG. 6A, the printing unit 3 and the display unit 7 operate. In this mode, the amount of electric consumption is comparatively low. That is, the capability of electric power supply to the printing unit 3 is high.

Figure 6B:
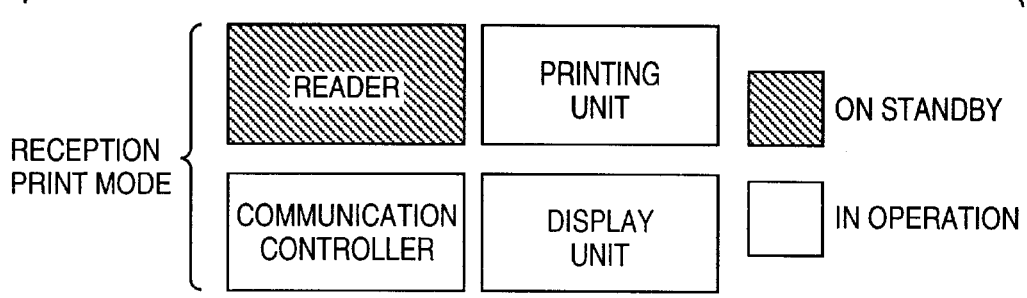

FIG. 6B shows functional blocks which operate in a mode to perform printing operation while performing facsimile reception operation (reception printing mode). In FIG. 6B, the printing unit 3, the communication controller 5 and the display unit 7 operate.

Figure 6C:
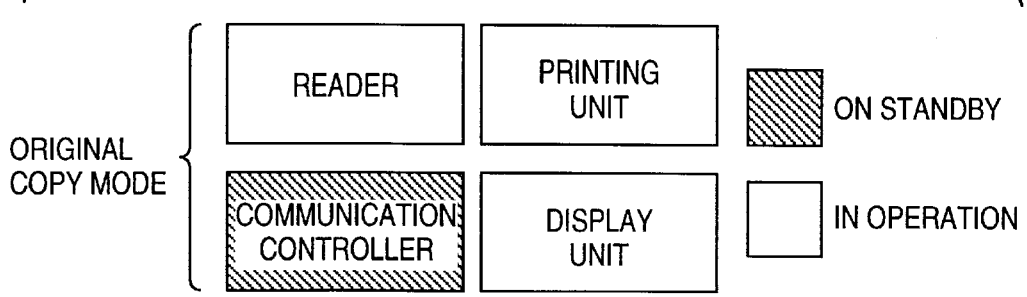

FIG. 6C shows functional blocks which operate in a mode to perform printing operation while copying an original image or reading and storing an original image (original copy mode). In FIG. 6C, the reading unit 2, the printing unit 3 and the display unit 7 operate.

Figure 6D:
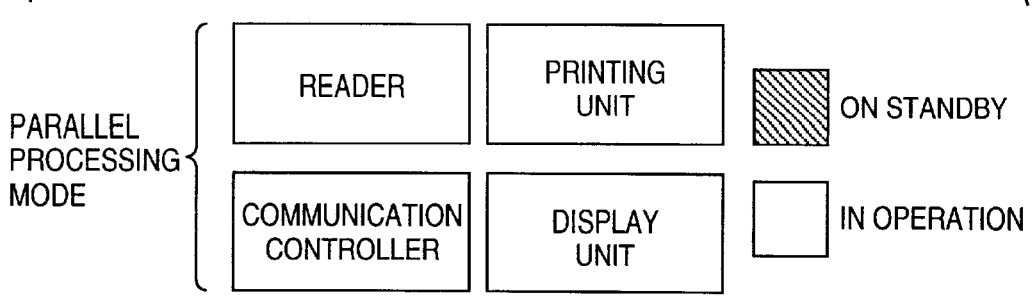

FIG. 6D shows functional blocks which operate in a mode to print a report during transmission of original image, or store an original image into the memory during reception printing (parallel processing mode). In FIG. 6D, all the reading unit 2, the printing unit 3, the communication controller 5 and the display unit 7 operate. The amount of electric consumption is the largest. That is, the electric power supply capability to the printing unit 3 is the lowest.

In the apparatus of the present embodiment, the number of pixels printable in one scanning of the printhead is calculated in accordance with the electric consumption in each of the above-described respective operation modes.

Figure 7:
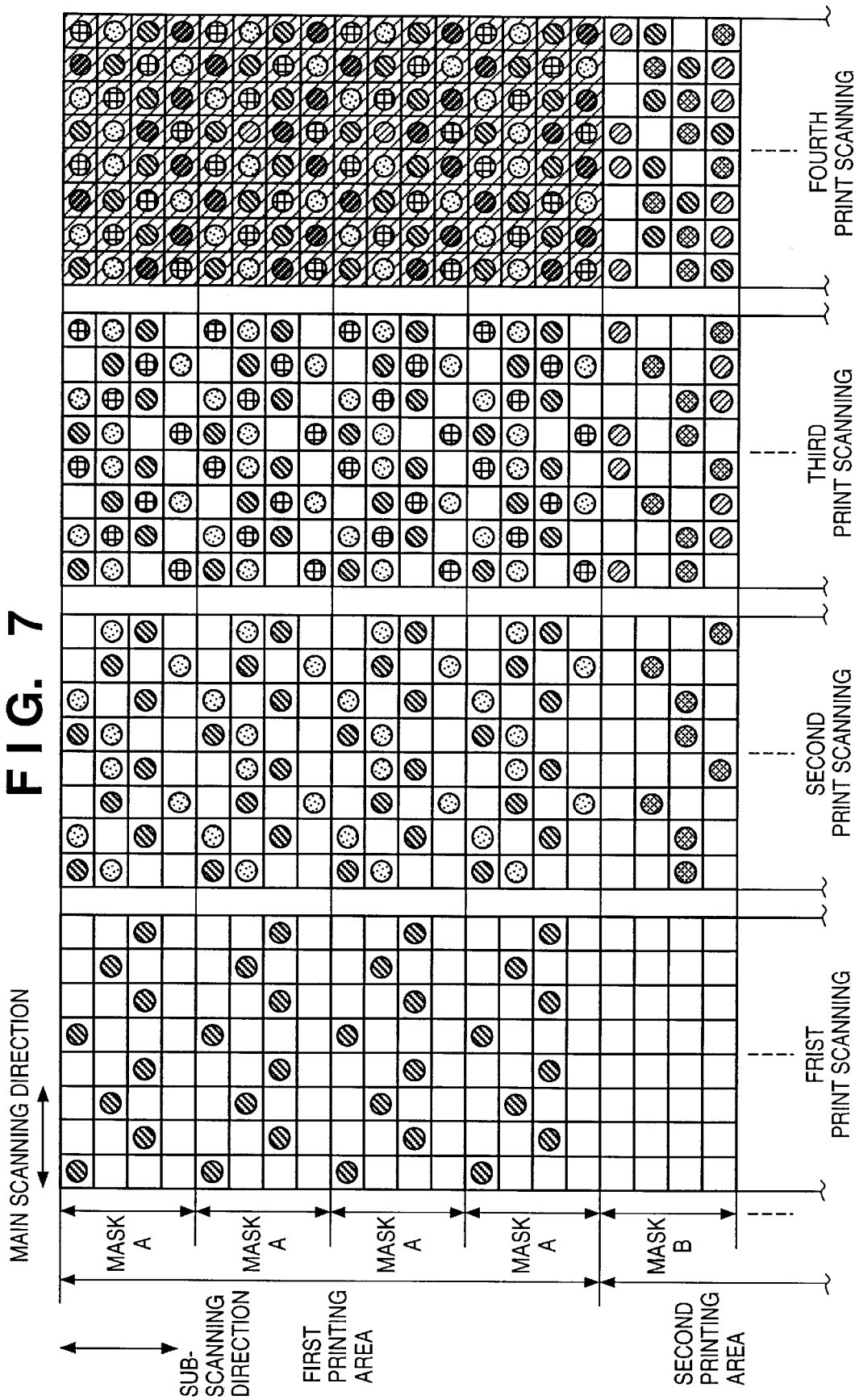
FIG. 7 is an explanatory view of printing in accordance with a multipath print control.

FIG. 7 is an explanatory view of printing in accordance with the multipath print control.

In FIG. 7, image printing is completed by four scannings (first print scanning, second print scanning, third print scanning and fourth print scanning) of the printhead with respect to the same area. Especially, the 64 nozzles arrayed in the subscanning direction are divided into four 16-zozzle groups for four printing areas (first printing area, second printing area, third printing area and fourth printing area), and 4×4 dot mask patterns different from each other are used with respect to the respective printing areas. For example, in FIG. 7, a mask A as one of the mask patterns is used with respect to the first printing area; and a mask B, with respect to the second printing area.

For example, when the mask A is used, printing with respect to an area having a printing width for 16 nozzles can be completed by four scannings. The mask B is used in a similar manner. Accordingly, the masks A and B respectively have four patterns as shown in FIG. 7, and in accordance with the logical OR of these four patterns, one ink-discharge opportunity is given for all the dots in the same scanning area.

By combination of these respectively four mask patterns of the masks A and B, image printing in the same area can be completed by two or three scannings.

For example, if a mask pattern obtained by the logical OR between "mask A" mask patterns used in the first and second print scannings and a mask pattern obtained by the logical OR between "mask A" mask patterns used in the third and fourth print scannings are used, image printing can be completed by scanning the same area twice. Otherwise, if a mask pattern obtained by the logical OR between "mask A" mask patterns used in the first and second print scannings and "mask A" mask patterns respectively used in the third and fourth print scannings are used, image printing can be completed by scanning the same area twice.

Note that printing may be controlled such that image printing can be completed by one scanning without using such mask pattern.

Figure 8:
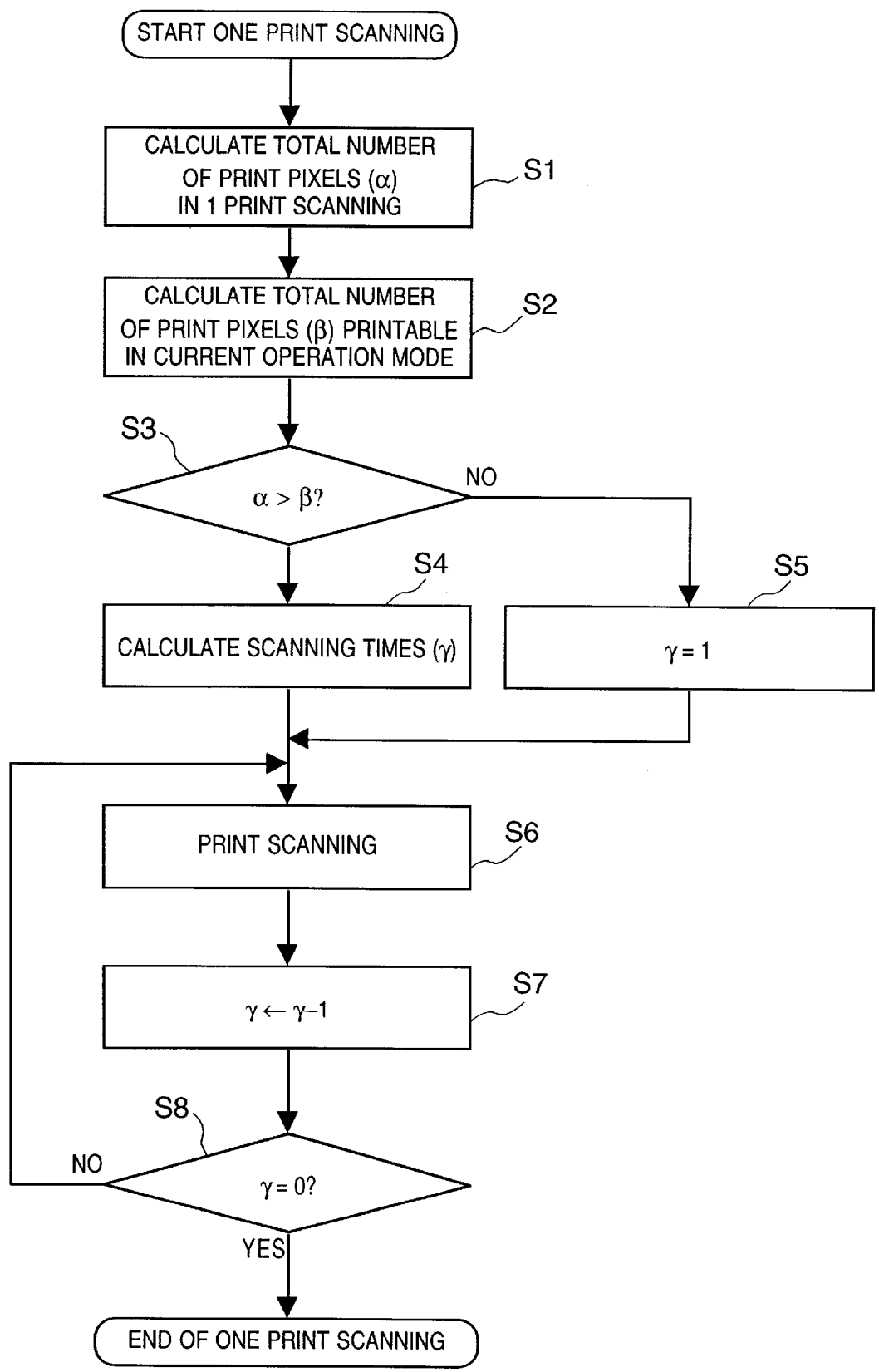
FIG. 8 is a flowchart showing the multipath print control.

Next, the multipath print control in the facsimile apparatus, having the above construction and operation modes, will be described with reference to the flowchart of FIG. 8.

When the controller 1 instructs to start one print scanning, the total number of print pixels ($\alpha$) requiring ink discharge in one print scanning is calculated based on image data at step S1. Note that in the present embodiment, the total number of print pixels ($\alpha$) is calculated by the controller 1, however, a hardware circuit such as a data counter to count the number of data having a predetermined value may be employed.

Next, at step S2, the total number of pixels ($\beta$) printable in one print scanning is calculated from estimation of electric power, which is used for operations other than a printing operation, at the reading unit 2, the communication controller 5 and the like according to the current operation mode and power supply capacity of the apparatus. Note that it may be arranged such that previously calculated numbers of pixels ($\beta$) printable in one print scanning are stored in the ROM 6, and a value corresponding to each of the operation modes is read from the ROM 6.

Further, at step S3, the total number of print pixels ($\alpha$) and the total number of printable pixels ($\beta$) are compared with each other. If $\alpha \leq \beta$ holds, it is determined that printing can be completed by one print scanning with the power supply capacity of the apparatus, the process proceeds to step S5, at which a scanning counter ($\gamma$) is set at "1". Then, the process proceeds to step S6.

On the other hand, if $\alpha > \beta$ holds at step S3, it is determined that printing cannot be completed by one print scanning with the power source capacity of the apparatus, then the process proceeds to step S4. At step S4, the number of paths in multipath printing is calculated, and the scanning counter ($\gamma$) is set at the obtained value.

For example, if the power source capacity (TP) of the facsimile apparatus is 300 VA, the operation mode is the parallel processing mode, the electric consumption (SP) at the reading unit 2 is 150 VA, the electric consumption (DP) at the display unit 7 is 40 VA, the electric consumption (CP) at the communication controller 5 is 10 VA and the electric consumption (RP) at other blocks is 20 VA, the electric power (PP) which can be supplied to the printing unit 3 is 80 VA. Further, in a case where the printing unit 3 requires 10 VA for print-sheet conveyance control, movement of carriage carrying the printhead and drive of the logical circuit, if electric power loss is ignorable, the electric power (EP) which can be used for electrifying the electrothermal transducers 30 to perform ink discharge is 70 VA.

On the other hand, if the electric power necessary for ink discharge is 240 VA to perform printing with 100% printing duty, printing cannot be completed by one print scanning unless the printing duty is 29.2% or lower.

Accordingly, if the printing duty is 50% in the calculation at step S1, as the electric power necessary for ink discharge is 120 VA, it is determined that multipath printing is performed by two scannings. That is, the scanning counter ($\gamma$) is set at "2".

As described above, the electric power (EP), used for electrifying the electrothermal transducers 30 provided in the printhead to perform ink discharge, is calculated, and possible printing duty (ED) is obtained from the value (EP) and electric power (PMAX) necessary for ink discharge with 100% printing duty. On the other hand, as the possible printing duty (ED) is percentage (%) of the ratio of the value "$\beta$" with respect to the maximum number of print pixels (MPXL) in printing completed by one print scanning, the number of scannings can be obtained from the ratio between printing duty obtained from the value "$\alpha$" and the possible printing duty (ED).

Next, at step S6, the printhead is scanned once to perform printing. At this time, if multipath printing is performed, the mask patterns are combined and a mask corresponding to the number of scannings is generated as described above, and printing is performed while masking image data with the generated mask. Further, at step S7, the value of the scanning counter ($\gamma$) is decremented by "−1". At step S8, it is examined whether or not the value of the scanning counter ($\gamma$) is "0". If $\gamma=0$ holds, the process ends, while if $\gamma \neq 0$ holds, the process returns to step S6 to continue the multipath printing, and repeat the processing until the value of the scanning counter ($\gamma$) becomes "0".

Each time image printing with respect to the same area has been completed, the above-described printing operation is repeated.

According to the present embodiment, the number of scannings in multipath printing can be changed in accordance with electric consumption which varies corresponding to respective operation modes of the facsimile apparatus. Accordingly, sufficient electric power can be used for printing operation in each mode, and maximum printing speed can be maintained in each mode.

Further, in accordance with the present embodiment, during printing operation, if an operation mode changes due to, e.g., completion of facsimile image data reception, the number of scannings in multipath printing can be changed from that time. Thus, printing speed can be improved by this fine print control.

This arrangement realizes optimization of the apparatus while attaining downsizing and reduction of cost of the power source of the apparatus, with minimizing degradation of the printing performance as much as possible.

Further, if the apparatus is in the parallel processing mode, the number of scannings in multipath printing is intentionally reduced maintaining an image-content recognizable level, to improve the printing speed, and further, other functions such as memory-storage of image data currently being received and used for printing have priority over the printing. Thus, improvement in operability and increase in printing speed can be attained.

Note that in the above embodiment, liquid droplets discharged from the printhead have been described as ink, and liquid contained in the ink tank has been also explained as ink, however, the liquid is not limited to ink. For example, processing liquid to improve fixability and water resisting quality or to improve image quality may be contained in the ink tank.

The embodiment described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of the so-called on-demand type or a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open Publication No. 59-123670 which discloses the arrangement using a slot common to a plurality of electrothermal transducers as a discharge portion of the electrothermal transducers, or Japanese Patent Laid-Open Publication No. 59-138461 which discloses the arrangement having an opening for absorbing a pressure wave of heat energy in correspondence with a discharge portion.

In addition, an exchangeable chip type printhead which can be electrically connected to the apparatus main unit and can receive an ink from the apparatus main unit upon being mounted on the apparatus main unit or a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in the above-mentioned embodiment of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

Note that the present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing software program code for realizing the functions of the aforesaid embodiment to a system or an apparatus, reading the program code with a computer (e.g., CPU, MPU) of the system or apparatus from the storage medium, then executing the program.

In this case, the program code read from the storage medium realize the functions according to the embodiment, and the storage medium storing the program code constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides aforesaid functions according to the above embodiment are realized by executing the program code which are read by a computer, the present invention includes a case where an OS (operating system) or the like working on the computer performs a part or entire processes in accordance with designations of the program code and realizes functions according to the above embodiment.

Furthermore, the present invention also includes a case where, after the program code read from the storage medium are written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiment.

As many apparently widely different embodiments of the present invention can be made without departing from the spirit and scope thereof, it is to be understood that the invention is not limited to the specific embodiments thereof except as defined in the appended claims.

What is claimed is:

1. A facsimile apparatus having a printing unit capable of multipath print control using a printhead and a plurality of means for facsimile communication, requiring electric consumption, comprising:

first calculation means for calculating printing duty of printing by said printhead, based on print data;

second calculation means for calculating electric power which can be supplied for the printing by said printhead, based on operation statuses of said plurality of means;

third calculation means for calculating a number of scannings in the multipath print control, based on the results of calculations by said first and second calculation means; and control means for controlling the printing by scanning said printhead based on the number of scannings calculated by said third calculation means.

2. The apparatus according to claim 1, wherein said plurality of means include:

reading means for reading an original image;

communication control means for transmitting facsimile image data based on said original image or receiving facsimile image data, via a communication line; and display means for displaying transmission/reception status of facsimile image data or a message.

3. The apparatus according to claim 2, wherein said second calculation means calculates the electric power which can be supplied for the printing by said printhead, based on respective operation statuses of said reading means, said communication control means and said display means.

4. The apparatus according to claim 3, wherein if said communication control means and said reading means do not operate, the amount of the electric power which can be supplied to said printhead is large, while if said communication control means and said reading means operate, the amount of the electric power which can be supplied to said printhead is small.

5. The apparatus according to claim 1, wherein said printhead is an ink-jet printhead which performs printing by discharging ink.

6. The apparatus according to claim 5, wherein said ink-jet printhead includes electrothermal transducers for generating thermal energy to be applied to the ink, for discharging ink by utilizing the thermal energy.

7. The apparatus according to claim 1, further comprising a plurality of mask patterns for the multipath print control.

8. The apparatus according to claim 7, wherein said control means generates a new mask pattern by combining the plurality of mask patterns, for performing printing based on the number of scannings calculated by said third calculation means.

9. The apparatus according to claim 1, further comprising scanning means for scanning said printhead.

10. The apparatus according to claim 9, wherein calculation by said first calculation means is performed based on print data used for printing with respect to an area scanned by one scanning of said printhead by said scanning means, and wherein calculations by said second and third calculation means are performed upon each printing on the area.

11. A print control method used in a facsimile apparatus having a printing unit capable of multipath print control using a printhead, a reading unit for reading an original image, a communication controller for transmitting/receiving facsimile image data via a communication line and a display unit for displaying transmission/reception status of the facsimile image data and a message, comprising:

a first calculation step of calculating printing duty of printing by said printhead, based on print data;

a second calculation step of calculating electric power which can be supplied for the printing by said printhead, based on operation statuses of at least said reading unit, said communication controller and said display unit;

a third calculation step of calculating a number of scannings in the multipath print control, based on the results of calculations at said first and second calculation steps; and a control step of controlling the printing by scanning said printhead based on the number of scannings calculated at said third calculation step.

12. A computer program product, stored in a computer readable medium, which performs a print control in a computer of a facsimile apparatus including a printing unit capable of multipath print control using a printhead, a reading unit for reading an original image, a communication controller for transmitting/receiving facsimile image data via a communication line and a display unit for displaying transmission/reception status of the facsimile image data and a message, comprising:

first calculation process procedure code for calculating printing duty of printing by said printhead, based on print data;

second calculation process procedure code for calculating electric power which can be supplied for the printing by said printhead, based on operation statuses of at least said reading unit, said communication controller and said display unit;

third calculation process procedure code for calculating a number of scannings in the multipath print control, based on the results of calculations at said first and second calculation processes; and control process procedure code for controlling the printing by scanning said printhead based on the number of scannings calculated at said third calculation process.

13. A printing apparatus, having a printhead and a plurality of means, requiring electric consumption, for performing printing operations other than driving the printhead, capable of performing multipath printing using the printhead, comprising:

first calculation means for calculating printing duty of printing by said printhead, based on print data;

second calculation means for calculating electric power which can be supplied for the printing by said printhead, based on operation statuses of said plurality of means;

third calculation means for calculating a number of scannings in the multipath print control, based on the results of calculations by said first and second calculation means; and control means for controlling the printing by scanning said printhead based on the number of scannings calculated by said third calculation means.

14. The apparatus according to claim 13, wherein said plurality of means include:

interface means for transmitting/receiving information to/from a host computer; and display means for displaying an apparatus status or a message.

15. The apparatus according to claim 14, wherein said second calculation means calculates the electric power which can be supplied for the printing by said printhead, based on respective operation statuses of said interface means and said display means.

16. The apparatus according to claim 13, wherein said printhead is an ink-jet printhead which performs printing by discharging ink.

17. The apparatus according to claim 16, wherein said ink-jet printhead includes electrothermal transducers for generating thermal energy to be applied to the ink, for discharging ink by utilizing the thermal energy.

18. The apparatus according to claim 13, further comprising a plurality of mask patterns for the multipath print control.

19. The apparatus according to claim 18, wherein said control means generates a new mask pattern by combining the plurality of mask patterns, for performing printing based on the number of scannings calculated by said third calculation means.

20. The apparatus according to claim 13, further comprising scanning means for scanning said printhead.

21. The apparatus according to claim 20, wherein calculation by said first calculation means is performed based on print data used for printing with respect to an area scanned by one scanning of said printhead by said scanning means, and wherein calculations by said second and third calculation means are performed upon each printing on the area.

* * * * *